US008018625B2

(12) United States Patent
Matsuura

(10) Patent No.: US 8,018,625 B2
(45) Date of Patent: Sep. 13, 2011

(54) IMAGE PROCESSING APPARATUS AND IMAGE PROCESSING SYSTEM

(75) Inventor: Hirokazu Matsuura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 632 days.

(21) Appl. No.: 12/078,995

(22) Filed: Apr. 9, 2008

(65) Prior Publication Data

US 2008/0247773 A1 Oct. 9, 2008

(30) Foreign Application Priority Data

Apr. 9, 2007 (JP) ................................ 2007-101809
Apr. 11, 2007 (JP) ................................ 2007-103399

(51) Int. Cl.
*H04N 1/40* (2006.01)
*G06K 9/36* (2006.01)

(52) U.S. Cl. ........................ 358/3.28; 382/232; 382/306

(58) Field of Classification Search ................. 358/3.28, 358/405, 434, 404, 406, 407, 435, 436, 438, 358/439; 382/232, 306; 713/176; 235/375, 235/385, 491; 283/45, 89, 900
See application file for complete search history.

(56) References Cited

U.S. PATENT DOCUMENTS

| | | | | |
|---|---|---|---|---|
| 4,476,381 | A * | 10/1984 | Rubin | 235/375 |
| 7,612,906 | B2 | 11/2009 | Toda | |
| 2004/0111647 | A1 | 6/2004 | Watanabe et al. | |

FOREIGN PATENT DOCUMENTS

| | | |
|---|---|---|
| CN | 1719860 | 1/2006 |
| CN | 1750579 | 3/2006 |
| JP | 2006-025255 | 1/2006 |
| JP | 2006-027145 | 2/2006 |
| JP | 2006-261716 | 9/2006 |
| JP | 2006-261718 | 9/2006 |

* cited by examiner

*Primary Examiner* — Charlotte M Baker
(74) *Attorney, Agent, or Firm* — Edwards Angell Palmer & Dodge LLP; David G. Conlin; George N. Chaclas

(57) ABSTRACT

New information is added to an information medium and is managed such that the information is not leaked when outputted. An image reading section reads the information medium and inputs images including a unique image and a code image. A detecting section determines the code image and the unique image from inputted images to detect the code image. An extracting section restores the code image to obtain confidential information. Alternatively, the extracting section restores the code image and obtains access information. A control section accesses a management apparatus and requests confidential information related to the information medium. The management apparatus transmits the specified confidential information to an image processing apparatus. The control section combines an image of the information medium and the code image or the confidential information and outputs the result. An image forming section prints the image on a record sheet.

16 Claims, 5 Drawing Sheets

IMAGE PROCESSING APPARATUS AND IMAGE PROCESSING SYSTEM

RELATED APPLICATIONS

This application claims the benefit of Japanese Patent Application No. 2007-101809, filed on Apr. 9, 2007 and Japanese Patent Application No. 2007-103399, filed on Apr. 11, 2007, the disclosure of which applications are incorporated herein in their entireties by this reference.

BACKGROUND OF THE INVENTION

1. Field of the Invention

The present invention relates to an image processing apparatus for copying an information medium having a code image such as a health insurance card.

2. Description of the Related Art

An image processing apparatus forms a code image such as a QR code or a bar code on a record sheet. The apparatus also extracts information contained in the code image and use the information by reading the code image on the record sheet.

For example, as disclosed in Japanese Patent Laid-Open No. 2006-27145, when an apparatus copies a printed material added with a bar code, it reads the bar code, obtains a URL of a Web page, accesses the Web page and prints the Web page.

Various information can be added to an information medium by using a code image. An information medium such as a credit card, an insurance card or a consultation ticket herein describes personal information such as an identification number, a portrait of the owner, a full name or an address. Such an information medium can describe the minimum information in it. However, further necessary information can be added by adding a code image to an information medium.

An image processing apparatus reads a code image on an information medium so that information is gained. The image processing apparatus outputs the gained information on a record sheet, for example, by printing. However, the code image on the information medium does not show the content, hence association between the outputted information and the information medium cannot be known. Therefore, the outputted information must be managed in association with the information medium, which makes the information management difficult and might induce leakage of confidential information.

In view of the above, an object of the present invention is to attach new information to an information medium, and certainly manage the information such that the information is not leaked if an image processing apparatus outputs the information.

SUMMARY OF THE INVENTION

An image processing apparatus according to the present invention comprises a reading section for reading an image from an information medium having a unique image formed on the surface thereof, a detecting section for detecting a specific image regarding confidential information from the read image, an extracting section for extracting the confidential information by analyzing the particular image, and an output section for outputting the confidential information as an image along with the unique image.

The specific image is formed on the information medium so that the confidential information is attached to the medium. The confidential information cannot be recognized from the specific image on the surface of the information medium. When the reading section reads the surface of the information medium, the detecting section detects the specific image from the inputted image. The extracting section analyzes the specific image to extract the confidential information represented by the particular image. The output section outputs the thus obtained confidential information obtained along with the image of the information medium such as by printing. This allows the image of the information medium attached with the confidential information and the confidential information to be handled in a unified manner and collectively managed.

The output section combines and outputs the unique image and the confidential information. This allows the unique image being the image of the information medium and the confidential information to be placed side by side and easily compared. That is, when the output section prints the image on a record sheet, it prints the confidential information in a margin part. The confidential information does not overlap with the unique image, thus providing a clear view.

A specific image is a code image produced by encoding confidential information. The extracting section restores a code image to obtain the confidential information. Then, the unique image and the code image are formed on the surface of the information medium, and the reading section reads the surface of the information medium and inputs an image.

The apparatus comprises an authenticating section for authenticating a user. The output section outputs the confidential information that is limited depending on a user. By the output limitation, an authorized user only can output the confidential information. Therefore, a third party can be prevented from illegally outputting the confidential information.

If a user who has instructed outputting is not authenticated, the output section outputs the specific image instead of the confidential information. If the user authentication is not performed, the output section does not output the specific image and the confidential information, but only outputs the unique image. This can restrain unnecessary output of confidential information and output of the related particular image, thus providing higher security.

In an image processing system according to the present invention, an image processing apparatus and a management apparatus for managing confidential information related to an information medium are connected communicatively, the image processing apparatus comprises: a reading section for reading an image from the surface of the information medium; a detecting section for detecting a specific image from the read image; an extracting section for extracting information to access the confidential information by analyzing the specific image; an access section for accessing the management apparatus and obtaining the confidential information; and an output section for outputting the obtained confidential information as an image along with the image of the information medium.

The specific image is formed on the information medium so that the confidential information is added indirectly to the medium. The confidential information cannot be recognized from the specific image. When the reading section reads the front side of the information medium, the detecting section detects the specific image from the inputted image. The extracting section analyzes the specific image and extracts access information to obtain the confidential information. The access section requests the confidential information from the management apparatus based on the access information. The management apparatus manages confidential information of each information medium. It outputs the confidential information to the image processing apparatus in response to a request by the image processing apparatus. The output section of the image processing apparatus outputs the confidential information obtained from the management apparatus along with the image of the information medium such as by printing.

A specific image is a code image produced by encoding confidential information. The extracting section restores a code image to obtain access information. The access information is information indicating the place where the confidential information is stored in the management apparatus. Based on the information, the image processing apparatus can access the management apparatus to obtain the confidential information. Then, the unique image and the code image are formed on the surface of the information medium, and the reading section reads the surface side of the information medium and inputs an image.

According to the present invention, confidential information as a specific image such as a code image is added to an information medium, or a specific image such as a code image necessary to obtain the confidential information is added to the information medium, so that the amount of information in the information medium can be increased. By reading the information medium, not only the image of the information medium but also the confidential information can be outputted as an image simultaneously, allowing the information medium and the confidential information to be associated with each other. This avoids confidential information from being present separately, makes management of the confidential information easy, and serves to prevent leakage of the confidential information.

DETAILED DESCRIPTION OF THE PREFERRED EMBODIMENTS

Figure 1:
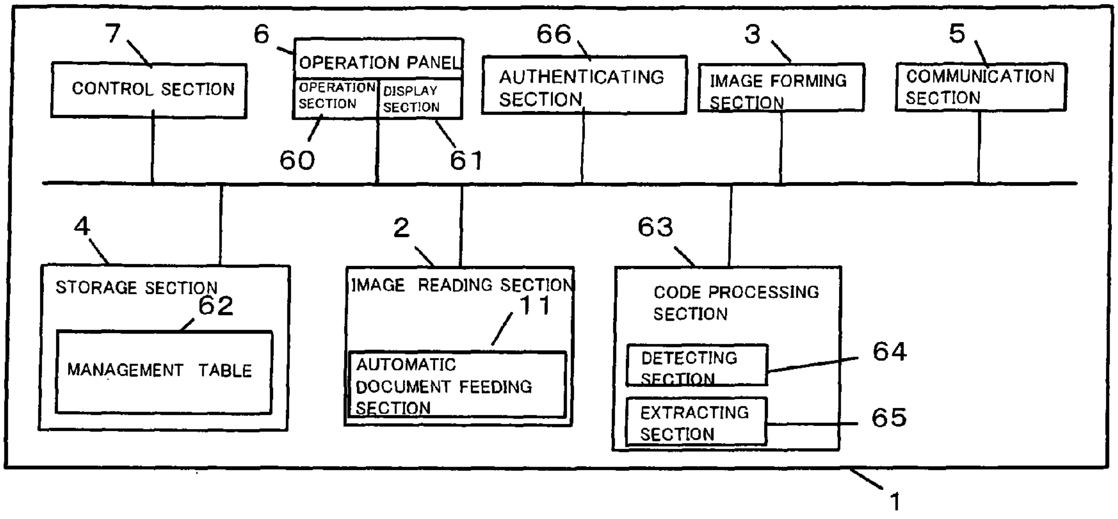
FIG. 1 is a control block diagram of an image processing apparatus according to the present invention.

An image processing apparatus according to this embodiment is shown in FIG. 1. The image processing apparatus, which is a composite machine for performing a copy mode, a print mode, a scanner mode and a facsimile mode, comprises, in a cabinet 1, an image reading section 2 for reading a document and inputting image data, an image forming section 3 for processing and printing the image data, a storage section 4 for storing the image data, a communication section 5 for communicating with an external apparatus, an operation panel 6 for input operations, and a control section 7 for controlling a processing section to execute processing on the image data depending on a mode. The processing section, which performs processing to output the inputted image data, includes the image forming section 3, the storage section 4 and the communication section 5.

Figure 2:
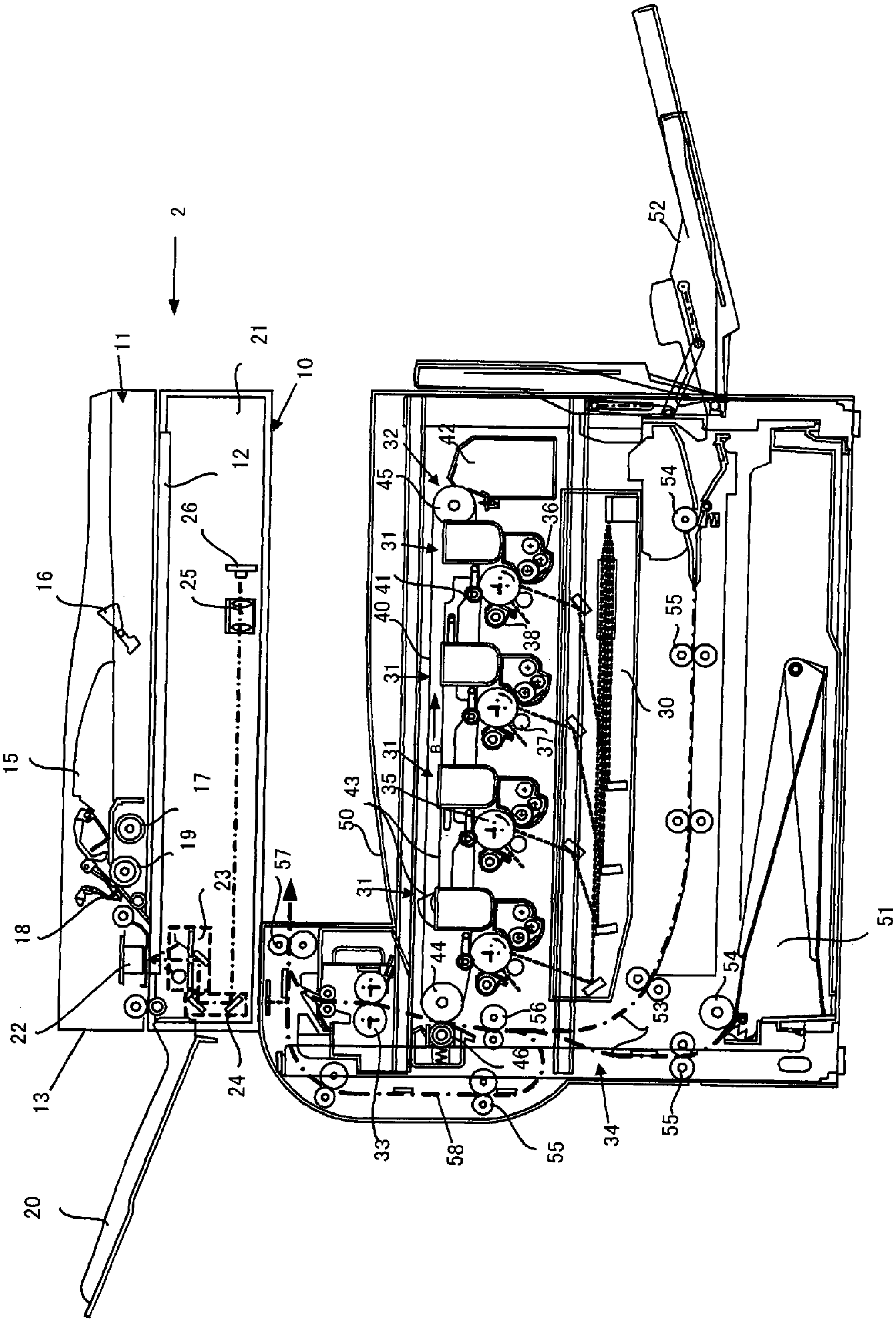
FIG. 2 is a diagram showing general overall configuration of the image processing apparatus.

As shown in FIG. 2, the image reading section 2, which is arranged on an upper part of the cabinet 1, comprises a scanner section 10 and an automatic document feeding section 11. The automatic document feeding section 11, which is provided above the scanner section 10, automatically feeds a document to read image data of the document.

On the top of the cabinet 1, a document table 12 made of platen glass is provided, and a document cover 13 is provided for covering the document table 12. The document cover 13 is equipped integrally with the automatic document carrying section 11. The document cover 13 can be freely opened and closed so that the automatic document feeding section 11 feeds a document while the document cover 13 is closed. While the document cover 13 is opened, a document can be mounted on the document table 12. Opening and closing of the document cover 13 is detected by a cover opening/closing sensor. A document size detection sensor is also provided for detecting the size of a document mounted on the document table 12.

When a document is set on a document setting tray 15 of the automatic document feeding section 11, a document sensor 16 detects the document is set. Then, the operation panel 6 inputs copy conditions such as the size of a record sheet for print and a variable magnification. Thereafter, reading an image of the document is started through input operation of a start key.

In the automatic document feeding section 11, a pickup roller 17 pulls out documents on the document setting tray 15 one by one. The documents pass between a stacking plate 18 and a carrying roller 19 and are sent out to the document table 12. The documents are carried on the document table 12 in the secondary scanning direction and ejected to a document ejection tray 20. The document ejection tray 20 is provided with a document ejection sensor, which detects any document on the document ejection tray 20.

The scanner section 10 comprises a first reading section 21 and a second reading section 22. A read region is formed on one side of the document table 12 so that a document passes through the read region while the document is carried on the document table 12. A first scanning unit 23 of the first reading section 21 is positioned below the read region so that the unit 23 reads the front side (lower side) of a document.

While the automatic document feeding section 11 feeds a document to the document table 12, the first scanning unit 23 moves to and is positioned at the read position and a second scanning unit 24 is also positioned at a predetermined position. An exposure lamp of the first scanning unit 23 irradiates the front side of the document from a lower part of the document table 12. Light reflected from the document is guided to an imaging lens 25 by respective reflecting mirrors of the first and second scanning units 23 and 24. The light reflected from the document is condensed to a CCD 26 by the imaging lens 25. The image on the surface of the document is formed on the CCD 26. Thereby, the image on the surface of the fed document is read.

Meanwhile, the second reading section 22 reads the back side (the upper-side surface) of a document. The second reading section 22, which is arranged above the document table 12, is provided with an LED for irradiating the back side of the document, an exposure lamp array including fluorescent, for example, a Cell Fock Lens array for collecting light reflected from the document for each pixel, a contact image sensor (CIS) for converting light reflected from the document received through the Cell Fock Lens array into electricity and outputting an analog image signal, and the like. This allows an image on the back side of a carried document to be read.

When a document is mounted on the document table 12, the first reading section 21 reads an image on the front side of the document. The first and second scanning units 23 and 24 move in the secondary scanning direction while maintaining a predetermined speed relationship with each other. The first scanning unit 23 exposes the document on the document table 12 to light and the first and second scanning units 23 and 24 guide light reflected from the document to the imaging lens 25. The imaging lens 25 forms an image of the document on the CCD 26.

When an image/images on one side/both sides of the document is/are read in the above way, image data on one side/both sides of the document is inputted to the control section 7. The control section 7, which includes an image processing section, performs various image processing on the image data by the image processing section. The image data is outputted to the image forming section 3.

The image forming section 3 prints a color image or monochrome image on a record sheet based on the inputted image data. The image forming section 3 comprises a laser scan unit 30, four image stations 31, an intermediate transfer belt unit 32, a fixing apparatus 33 and a conveyer apparatus 34.

Each of the image stations 31 forms a color image depending on respective colors of black, cyan, magenta and yellow, respectively. Each of the image stations 31 comprises a photoreceptor drum 35, a developing apparatus 36, a charging apparatus 37, a cleaning apparatus 38 and a static eliminator (not shown).

The photoreceptor drum 35 is rotatably driven in one direction, the cleaning apparatus 38 cleans remaining toner off the surface of the photoreceptor drum 35, and the static eliminator removes electricity on the surface of the photoreceptor drum 35. The charging apparatus 37 uniformly charges the surface of the photoreceptor drum 35.

The laser scan unit 30 modulates laser light based on image data inputted such as from the image reading section, and repetitively scans the surface of the photoreceptor drum 35 by the laser light in the horizontal scanning direction to form an electrostatic latent image on the surface of the photoreceptor drum 35. The developing apparatus 36 supplies toner to the surface of the photoreceptor drum 35, develops an electrostatic latent image, and forms a toner image on the surface of the photoreceptor drum 35.

The intermediate transfer belt unit 32 comprises an intermediate transfer belt 40, an intermediate transfer roller 41, a transfer belt cleaning apparatus 42 and a tension mechanism 43. The intermediate transfer belt 40, which is arranged above the respective photoreceptor drums 35 and wound around a driving roller 44 and a follower roller 45, rotates in a direction of an arrow B.

The intermediate transfer roller 41, which is arranged in opposition to the photoreceptor drum 35 across the intermediate transfer belt 40, is applied with transfer bias power voltage. Power voltage with the polarity opposite to that of the voltage of the toner is applied to the intermediate transfer roller 41, so that a toner image on the surface of the photoreceptor drum 35 is transcribed to the intermediate transfer belt 40. Toner images of the respective colors are layered on the intermediate transfer belt 40 and a combined multicolor toner image is formed.

The intermediate transfer roller 41 is arranged with being pressed on the intermediate transfer belt 40, and applied with power voltage with the polarity opposite to that of the voltage of the toner. A toner image on the intermediate transfer belt 40 is transcribed to a record sheet carried between a transfer roller 46 and the intermediate transfer belt 40 by the transfer roller 46. The transfer belt cleaning apparatus 42 removes toner remaining on the intermediate transfer belt 40.

The toner image transcribed to the record sheet is applied with heat and pressure by the fixing apparatus 33 and fixed on the record sheet so that an image is formed on the record sheet. In this way, the record sheet on which the image is printed is ejected to a ejection tray 50 provided on the top of the cabinet 1.

The conveyer apparatus 34 carries a record sheet from a sheet cassette 51 or manual feed tray 52 along a carrying path 53. The carrying path 53 runs between the intermediate transfer belt 40 and the transfer roller 46 and through the fixing apparatus 33 to the ejection tray 50.

The conveyer apparatus 34 comprises a pickup roller 54, a carrying roller 55, a resist roller 56 and an ejecting roller 57. Record sheets in the sheet cassette 51 or manual feed tray 52 are sent out to the carrying path 53 one by one, carried through the carrying path 53 and ejected to the ejection tray 50. While the record sheets are carried, an image is printed on a record sheet. A switch back carrying path 58 is provided for both-side printing. After an image is fixed on a record sheet, the sheet passes through the switch back carrying path 58 by the carrying roller 55 and carried between the intermediate transfer belt 40 and the transfer roller 46. A record sheet of which both sides are printed with images passes through the fixing apparatus 33 and is ejected to the ejection tray 50.

The operation panel 6, which is provided to the scanner section 10, includes an operation section 60 and a display section 61. The operation section 60 comprises various operation keys. The display section 61, being an LCD display, is a touch panel. Touch keys are formed on an operation screen displayed on the display section 61 and function as the operation keys.

The communication section 5 comprises a communication interface, which is connected to a network such as a LAN or a WAN. The network connects to a plurality of external apparatuses. The external apparatuses include another image processing apparatus, an information processing apparatus such as a personal computer, or a server. The network is connected to the Internet from a rooter via a communication line such as a telephone line or an optical fiber. The communication section 5 can communicate with the foreign apparatuses through the network according to a predetermined communication protocol. The image processing apparatuses can also communicate with one another. The communication in the network can be wired or wireless. The image processing apparatuses and external apparatuses constitute an image processing system.

The communication section 5 is also provided with a modem apparatus. The modem apparatus connects to the telephone line. An image processing apparatus can communicate with a facsimile. The image processing apparatus can communicate data with an Internet facsimile through the network. The communication section 5 further comprises a communication terminal or a communication card for wireless communication. The communication terminal connects to a storage medium such as a USB memory or an IC card, while the communication section 5 transmits and receives data to and from the storage medium. The section 5 also transmits/receives data to/from the communication terminal such as a mobile phone or a PDA through the communication card by the wireless communication.

The storage section 4 is a hard disk apparatus. The storage section 4 stores image data inputted from the image reading section 2 or image data inputted from the communication section 5. The inputted image data is temporally saved in an image memory such as a DRAM, and forwarded from the image memory to the storage section 4 after image processing or encryption processing is performed. When the image data is read out from the storage section 4, the image data is subjected to the image processing or the decryption processing and saved in the image memory. Afterward, the image data is outputted to the outside by printing, data transmission and facsimile communication depending on processing to be executed.

The storage section 4 includes a management table 62, which stores information necessary to operate the image processing apparatus such as control information and setting information of the image processing apparatus and user authentication information. When the information is created or modified, information in the management table 62 is updated. The management table 62 may be provided in a non-volatile memory other than the storage section 4.

The control section 7 is a micro computer including a CPU, a ROM and a RAM, in which the CPU reads out a control program stored in the ROM to the RAM to execute the control program. According to the control program, the respective sections operate. When an input section such as the image reading section 2 or the communication section 5 inputs image data, one of the print mode, copy mode, scanner mode or facsimile mode is executed based on processing conditions contained in input information from the operation section 60 or header information of the image data inputted from the foreign apparatuses. The control program also includes a browser or e-mail software, while the control section 7 communicates data with the external apparatuses according to a communication protocol such as the TCP/IP protocol and transmits and receives an e-mail.

While the control section 7 performs each mode, it temporarily saves the inputted image data in the storage section 4. The control section 7 also performs a filing mode to save the inputted image data in the storage section 4 for management. The saved image data is again outputted according to instructed processing.

The outputted image data is erased from the storage section 4 according to an instruction by the control section 7. For this erasure, random data is overwritten on the image data so that the image data is invalidated so as not to be restored. In this way, image data is prevented from being used in an unauthorized way through the invalidation processing and further encryption processing.

The image processing apparatus includes a code processing section 63 for outputting information gained from a 2-dimensional code such as a QR code or an code image such as a bar code. The code processing section 63 comprises a detecting section 64 for detecting a code image from an image read by the image reading section 2 and an extracting section 65 for extracting information added as the code image by analyzing the code image. The control section 7 outputs the information obtained from the extracting section 65 through the image forming section 3, the communication section 5 or the display section 61.

The image processing apparatus has a function of reading the front side and back side of an information medium such as a credit card, a driver license, an insurance card, a Basic Resident Register card or a consultation ticket, combining the respective images on the front side and back side, arranging the images on a single page side by side and outputting the page. The function is herein referred to as a card shot function. For an information medium having an image on only one side, when the card shot function is executed, the image on the one side is outputted on a single page.

Figure 3:
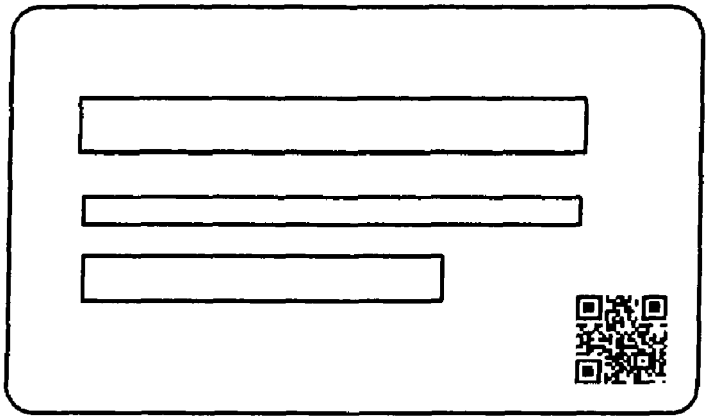
FIG. 3 is a diagram showing the surface of a consultation ticket.
Figure 4:
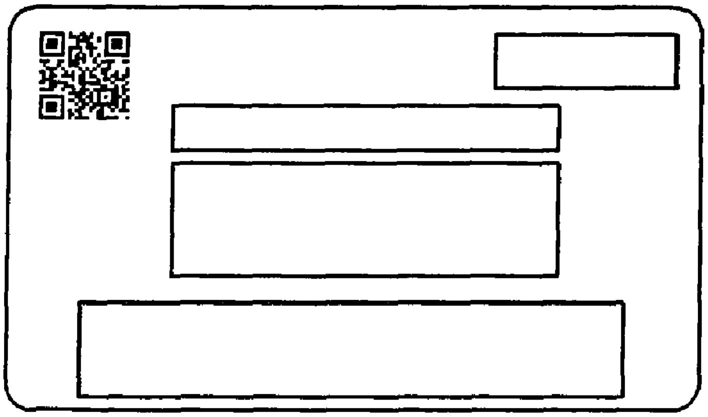
FIG. 4 is a diagram showing the surface of a health insurance card.

An information medium describes personal information. For example, a consultation ticket describes a full name, a birth date and a card number on the front side, as shown in FIG. 3. An insurance card describes an expiration date, symbols, a full name, a birth date, and the like, as shown in FIG. 4. An address is described on the back side. As illustrated, unique images are formed as images representing personal information on the front side and the back side of an information medium.

An information medium is added with a 2-dimensional code as a code image. A code image is encoded personal confidential information. For example, confidential information in a consultation ticket includes various information such as a medical examination history, a medical history or prescriptions. Confidential information in a driver license includes various information such as a criminal record or an administrative punishment history such as license suspension. Confidential information in an insurance card includes various information such as a family structure or a hospital visit history. As illustrated, a code image is a specific image regarding confidential information. The image processing apparatus, which has a function of encoding inputted information to create a code image, prints the code image on the printable front side of an information medium.

When the image reading section 2 reads and processes an information medium having a code image, it reads the information medium and inputs images including a specific image and the code image. The detecting section 64 of the code processing section 63 determines the code image and the specific image from the inputted images to detect the code image. The extracting section 65 restores the detected code image to obtain confidential information. The control section 7 functions as an output section for controlling the image forming section 3, the communication section 5 or the display section 61. The output section outputs an image of the information medium and the confidential information obtained from the code image as an image.

Figure 5:
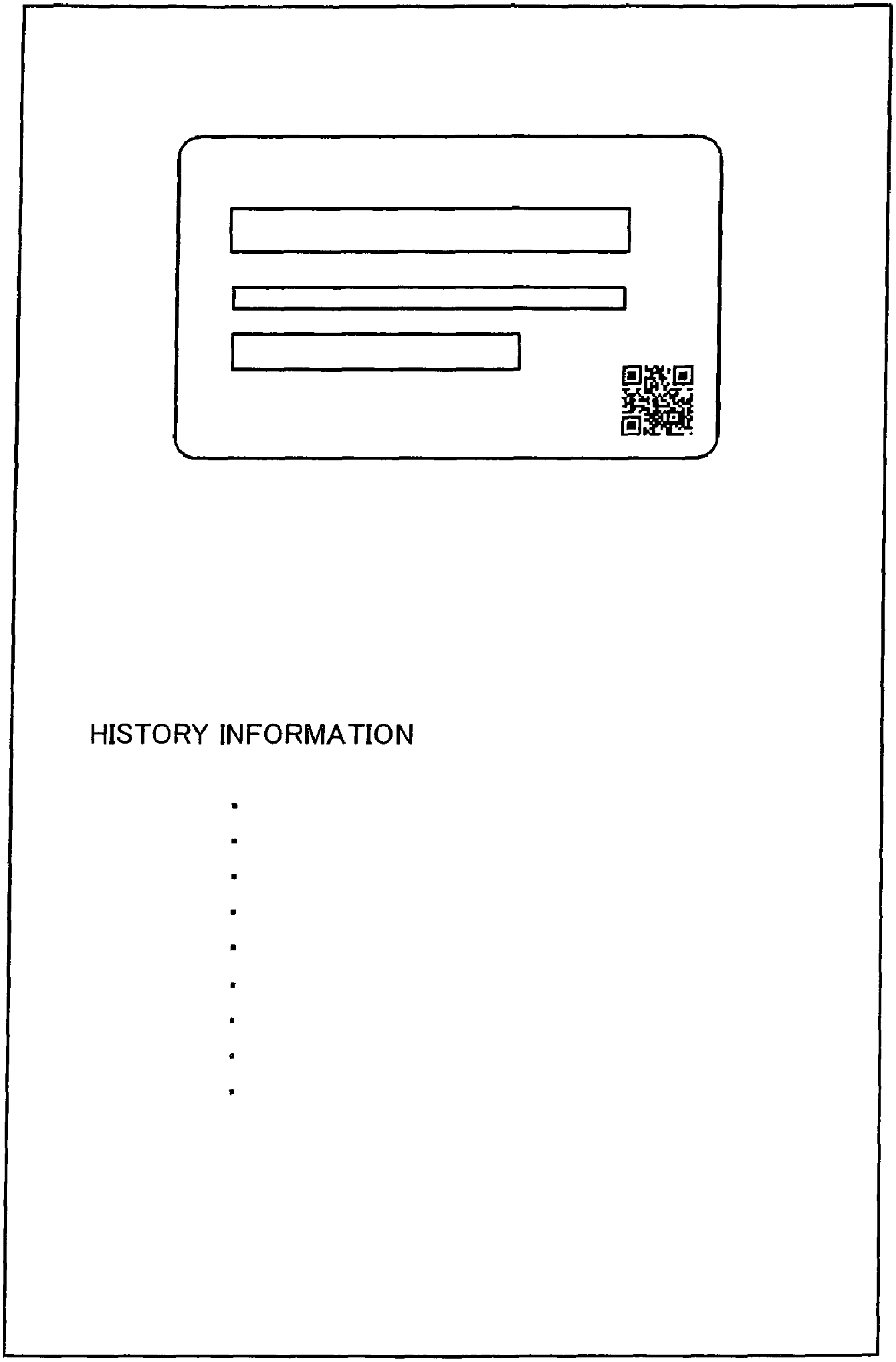
FIG. 5 is a diagram showing a record sheet on which an image of an information medium and confidential information are printed.

For example, when the card shot function copies the information medium, the image of the information medium and the confidential information are combined, printed on a record sheet and outputted, as shown in FIG. 5. The image of the information medium including the unique image and the code image is printed in a predetermined region of the record sheet. The confidential information such as history information is printed in a margin part other than the predetermined region.

To be displayed and outputted on the display section 61 or a screen of the information processing apparatus, the image of the information medium and the confidential information are similarly combined, the confidential information is arranged in the margin part, and they are displayed on a single screen.

In this way, when confidential information is converted to a code image and added to an information medium, the confidential information can be outputted to be associated with a unique image of the information medium by reading the code image. Typically, a user who uses a driver license or consultation ticket or a third party cannot know information other than content described in an information medium. However, a user who needs the confidential information can easily obtain the confidential information. Additionally, personal information and confidential information in an information medium cannot be separated, but handled in a unified manner, making information management easy so that the confidential information is not leaked.

Figure 6:
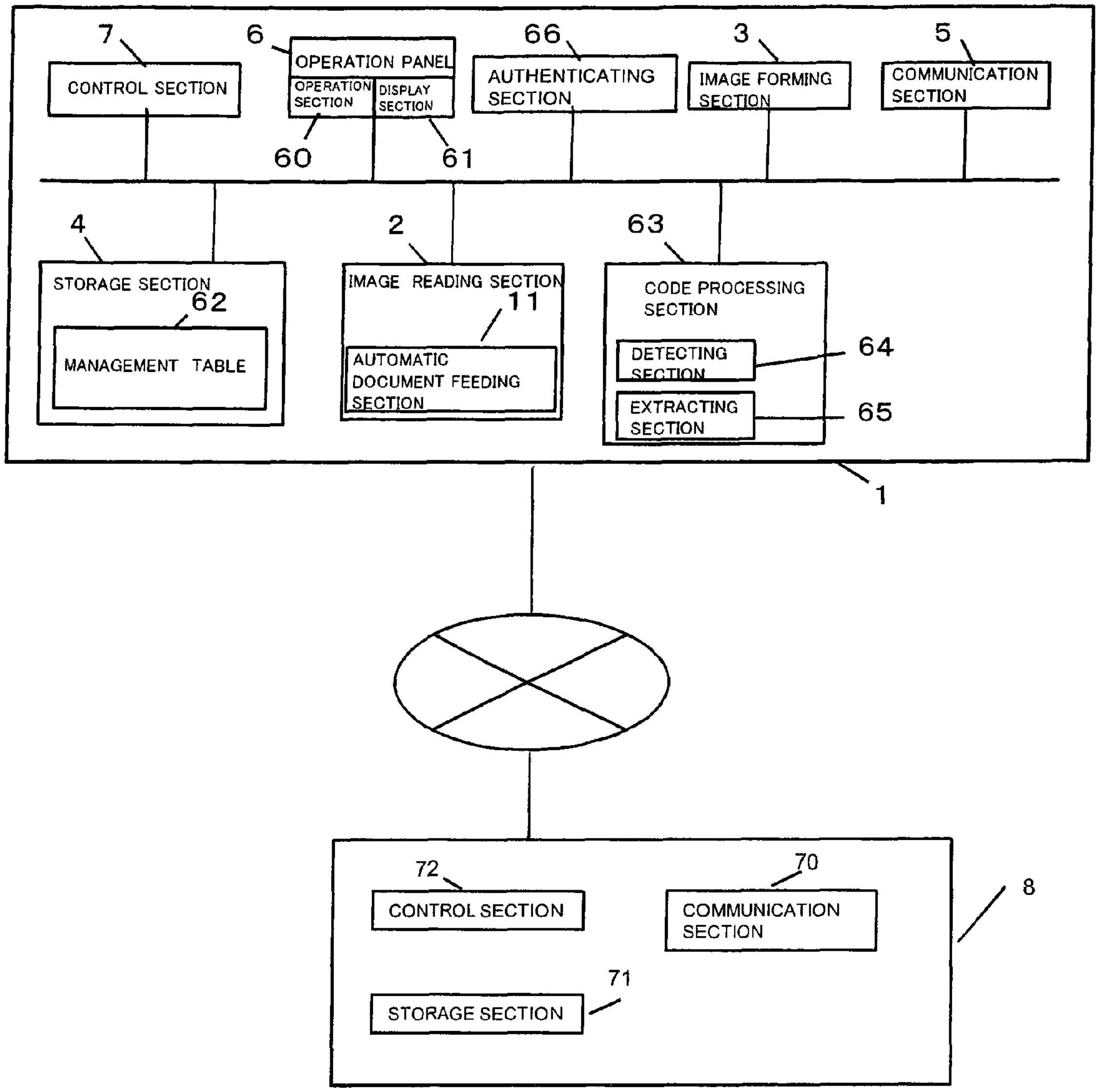
FIG. 6 is a control block diagram of an image processing apparatus and a management apparatus according to the present invention.

As another embodiment of an image processing system, the image processing apparatus is connected communicatively to a management apparatus 8 through a network, as shown in FIG. 6. The image processing apparatus and the management apparatus 8 constitute the image processing system. The basic configuration of the image processing apparatus is same as shown in FIG. 1.

An information medium is added with a code image. The code image, which is a 2-dimensional code such as a QR code or a bar code, is used to add confidential information related to the information medium. For example, confidential information in a consultation ticket includes various information such as a medical examination history, a medical history or prescriptions. Confidential information in a driver license includes various information such as a criminal record or an administrative punishment history such as license suspension. Confidential information in an insurance card includes various information such as a family structure or a hospital visit history. In the image processing system, confidential information added to an information medium is managed by the management apparatus 8.

The management apparatus 8, which is an information processing apparatus such as a personal computer, comprises a communication section 70 for communicating with an image processing apparatus or external apparatuses, a storage section 71 for storing confidential information in each information medium, and a control section 72, as shown in FIG. 6.

In the above, a code image is encoded access information to access confidential information stored in the management apparatus 8. That is, a code image is a specific image to associate an information medium with confidential information corresponding to the information medium.

The access information is an address indicating the place where confidential information on a network is located. As an address, a URL is used. An address is assigned to each piece of confidential information. Confidential information can be accessed by specifying an address for communication.

Confidential information related to an information medium is created by an external apparatus. The external apparatus transmits the confidential information to the management apparatus 8 for registration. When the control section 72 of the management apparatus 8 receives the confidential information, it stores the confidential information in the storage section 71. At this time, the control section 72 registers the confidential information related to the information medium by writing the related information medium and an address assigned to confidential information in a management table.

The image processing apparatus, which has a function of encoding the inputted information to create a code image, prints a code image on an information medium having the printable front side. When the confidential information is added to the information medium herein, the control section 7 of the image processing apparatus accesses the management apparatus 8 and specifies the information medium. The management apparatus 8 notifies the image processing apparatus of an address of the specified information medium. The image processing apparatus encodes the received address as access information of confidential information and prints the created code image on the information medium.

Alternatively, the information medium is created by a general card creation apparatus in a state that a code image has been formed previously on the surface thereof. In that case, confidential information has been registered in the management apparatus 8 and the address has been decided. As such, a code image can be formed by obtaining access information from the management apparatus 8, hence an information medium having the code image can be created.

The image processing apparatus includes the code processing section 63 for outputting information gained from a code image. The code processing section 63 comprises the detecting section 64 for detecting a code image from an image read by the image reading section 2 and the extracting section 65 for extracting information added as the code image by analyzing the code image.

When the image reading section 2 reads and processes an information medium having a code image, it reads the information medium and inputs images including a unique image and the code image. The detecting section 64 of the code processing section 63 determines the code image and the specific image from the inputted images to detect the code image. The extracting section 65 restores the detected code image to obtain access information.

The control section 7 includes an access section for accessing the management apparatus 8 based on the access information and obtaining confidential information and an output section for outputting the obtained confidential information as an image along with an image of the information medium. The access section requests the management apparatus 8 to transmit confidential information related to the information medium through the communication section 5. When the management apparatus 8 transmits the specified confidential information, the access section receives the confidential information. The output section controls the image forming section 3, the communication section 5 or the display section 61 to output the confidential information obtained from the management apparatus 8 as an image along with the image of the information medium.

For example, when the card shot function copies the information medium, the image of the information medium and the confidential information are combined, printed on a record sheet and outputted, as shown in FIG. 5. The image of the information medium including the unique image and the code image is printed in a predetermined region of the record sheet. The confidential information such as history information is printed in a margin part other than the predetermined region.

To be displayed and outputted on the display section 61 or a screen of the information processing apparatus, the image of the information medium and the confidential information are similarly combined, the confidential information is arranged in the margin part, and they are displayed on a single screen.

In this way, when confidential information is converted to a code image and added to an information medium, the confidential information can be outputted to be associated with a unique image of the information medium by reading the code image. As such, personal information and confidential information in an information medium cannot be separated, but handled in a unified manner, making information management easy so that the confidential information is not leaked. The management apparatus 8 is also used to manage much confidential information, hence further confidential information can be added to an information medium than the case in that confidential information is directly added to an information medium. Moreover, the management apparatus 8 manages confidential information so that the information is always updated to the latest information and the latest confidential information can be attached to the medium.

Meanwhile, the image processing apparatus is provided with an authenticating section 66 for authenticating a user. Processing that can be executed is limited depending on a user. That is, a security level is set for each user. When authentication information such as ID information, a password and biometric information is inputted, the authenticating section 66 identifies a user based on the information. Then, the section 66 authenticates the user based on previously registered user information. As user information, a security level for a user is registered. A security level for a highly authorized user such as an administrator is high, while a security level for a low authorized user such as a guest is low. If a security level for a user is higher, limitation of processing on an inputted image is lower, while if a security level for a user is lower, limitation of the processing is higher.

The control section 7 limits an output of confidential information obtained from a code image depending on an authenticated user. That is, the section 7 outputs the obtained confidential information depending on a security level for a user who instructed to process the card shot function. If the security level for the user is high, it outputs all the obtained confidential information. If the security level for the user is low, it only outputs part of the obtained confidential information. For example, it only outputs a first portion of the confidential information, or outputs the confidential information thinned out.

If authentication information is inputted and a user cannot be authenticated, the control section 7 does not output confidential information, but outputs a specific image. That is, if a user who is not an authenticated user instructs processing, the control section 7 does not obtain confidential information, even if a code image is detected, and outputs only an image of the inputted information medium such as by printing. The outputted image contains a code image.

If the user authentication is not performed, the control section 7 does not output confidential information or a code image. That is, the control section 7 performs image processing to detect a code image from an image of the inputted information medium and erase the code image. Then, the control section 7 outputs an image from which the code image is erased. The outputted image contains a specific image, but does not contain a code image or confidential information.

If there is the management apparatus 8, the output limitation by the control section 7 of the image processing apparatus may be performed by the control section 72 of the management apparatus 8 instead. The management apparatus 8 receives user authentication information from the image processing apparatus, performs the output limitation of confidential information, and transmits confidential information after the limitation to the image processing apparatus.

As described in the above, only necessary information can be outputted by limiting an output of confidential information added to an information medium depending on a user. Therefore, unnecessary output of confidential information can be prevented, thus preventing the leakage of confidential information.

The present invention is not limited to the above embodiments, but many modifications and changes can be added to the above embodiments within the scope of the present invention. A specific image added to an information medium is not limited to a code image such as a 2-dimensional code, but may be an image represented in a particular color or a pattern or combination of them depending on confidential information.

For access information, an address and a key to access confidential information may be combined. The image processing apparatus creates a specific password based on the key. When the management apparatus confirms the specific password from the image processing apparatus, it permits access to the confidential information.

What is claimed is:

1. An image processing apparatus comprising:

a reading section for reading an image from an information medium having a unique image and a specific image regarding confidential information formed on the surface of the information medium;

a detecting section for detecting a specific image from the read image;

an extracting section for extracting the confidential information by analyzing the specific image;

an output section for outputting the confidential information as an image along with the unique image and the specific image; and an authenticating section for authenticating a user, wherein the output section outputs the confidential information that is limited depending on a user, wherein if a user who has instructed outputting is not authenticated, the output section outputs the specific image instead of the confidential information.

2. The image processing apparatus according to claim 1, wherein the output section combines and outputs the unique image, the specific image and the confidential information.

3. The image processing apparatus according to claim 2, wherein when the output section prints the image on a record sheet, the output section prints the confidential information in a margin part.

4. The image processing apparatus according to claim 1, further comprising an authenticating section for authenticating a user, wherein the output section outputs the confidential information that is limited depending on a user.

5. The image processing apparatus according to claim 4, wherein if a user who has instructed outputting is not authenticated, the output section outputs the specific image instead of the confidential information.

6. The image processing apparatus according to claim 1, wherein a specific image is a code image produced by encoding confidential information and the extracting section restores a code image to obtain the confidential information.

7. The image processing apparatus according to claim 6, wherein the unique image and the specific image are formed on the surface of the information medium, and the reading section reads the surface of the information medium and inputs an image.

8. An image processing apparatus comprising:

a reading section for reading an image from an information medium having a unique image and a specific image regarding confidential information formed on the surface of the information medium;

a detecting section for detecting a specific image from the read image;

an extracting section for extracting the confidential information by analyzing the specific image;

an output section for outputting the confidential information as an image along with the unique image and the specific image; and an authenticating section for authenticating a user, wherein the output section outputs the confidential information that is limited depending on a user, wherein if the user authentication is not performed, the output section does not output the particular image and the confidential information, but only outputs the unique image.

9. An image processing system in which an image processing apparatus and a management apparatus for managing confidential information related to an information medium are connected communicatively, wherein the image processing apparatus comprises:

a reading section for reading an image having a unique image and a specific image from the surface of the information medium;

a detecting section for detecting a specific image from the read image;

an extracting section for extracting information to access the confidential information by analyzing the specific image;

an access section for accessing the management apparatus and obtaining the confidential information;

an output section for outputting the obtained confidential information as an image along with the image read from the information medium; and an authenticating section for authenticating a user, wherein the output section outputs the confidential information that is limited depending on a user, wherein if a user who has instructed outputting is not authenticated, the output section outputs the specific image instead of the confidential information.

10. The image processing system according to claim 9, wherein the output section combines and outputs the image of the information medium and the confidential information.

11. The image processing system according to claim 10, wherein when the output section prints the image on a record sheet, the output section prints the confidential information in a margin part.

12. The image processing system according to claim 9, comprising an authenticating section for authenticating a user, wherein the output section outputs the confidential information that is limited depending on a user.

13. The image processing system according to claim 12, wherein if a user who has instructed outputting is not authenticated, the output section outputs the specific image instead of the confidential information.

14. The image processing system according to claim 9, wherein a specific image is a code image produced by encoding access information and the extracting section restores a code image to obtain the access information.

15. The image processing system according to claim 14, wherein the management apparatus stores the registered confidential information in the storage section and creates access information corresponding to the confidential information.

16. An image processing system in which an image processing apparatus and a management apparatus for managing confidential information related to an information medium are connected communicatively, wherein the image processing apparatus comprises:

a reading section for reading an image having a unique image and a specific image from the surface of the information medium;

a detecting section for detecting a specific image from the read image;

an extracting section for extracting information to access the confidential information by analyzing the specific image;

an access section for accessing the management apparatus and obtaining the confidential information;

an output section for outputting the obtained confidential information as an image along with the image read from the information medium; and an authenticating section for authenticating a user, wherein the output section outputs the confidential information that is limited depending on a user, wherein if the user authentication is not performed, the output section does not output the specific image and the confidential information, but only outputs the unique image.

* * * * *